US007906444B2

(12) United States Patent
Liebald et al.

(10) Patent No.: US 7,906,444 B2
(45) Date of Patent: Mar. 15, 2011

(54) ARMOR MATERIAL MADE OF GLASS CERAMICS

(75) Inventors: Rainer Liebald, Nauheim (DE); Wolfram Beier, Essenheim (DE); Jochen Alkemper, Klein-Winternheim (DE); Thilo Zachau, Buerstadt-Riedrode (DE); Dirk Sprenger, Stadecken-Elsheim (DE)

(73) Assignee: Schott AG (DE)

( * ) Notice: Subject to any disclaimer, the term of this patent is extended or adjusted under 35 U.S.C. 154(b) by 104 days.

(21) Appl. No.: 12/063,701

(22) PCT Filed: Aug. 2, 2006

(86) PCT No.: PCT/EP2006/007635
§ 371 (c)(1),
(2), (4) Date: Sep. 8, 2008

(87) PCT Pub. No.: WO2007/019959
PCT Pub. Date: Feb. 22, 2007

(65) Prior Publication Data
US 2009/0156384 A1   Jun. 18, 2009

(30) Foreign Application Priority Data

Aug. 13, 2005  (DE) .................... 10 2005 038 457

(51) Int. Cl.
*C03C 10/04* (2006.01)
*C03C 10/08* (2006.01)
*C03C 10/02* (2006.01)
*C03C 14/00* (2006.01)

(52) U.S. Cl. .................... 501/9; 501/5; 501/10; 501/32; 89/36.02

(58) Field of Classification Search ............... 501/9, 10, 501/32, 5; 89/36.02
See application file for complete search history.

(56) References Cited

U.S. PATENT DOCUMENTS

| | | | | |
|---|---|---|---|---|
| 4,162,921 A * | 7/1979 | Litvinov et al. | .................. | 501/9 |
| 4,473,653 A | 9/1984 | Rudoi | | |
| 5,060,553 A | 10/1991 | Jones | | |
| 5,104,830 A | 4/1992 | Drouet | | |
| 5,284,806 A | 2/1994 | Gadkaree | | |
| 6,204,211 B1 * | 3/2001 | Ohara et al. | .................... | 501/10 |
| 6,544,913 B2 * | 4/2003 | Kim et al. | ....................... | 501/32 |
| 7,284,469 B2 * | 10/2007 | Raichel et al. | ............... | 89/36.02 |
| 7,291,571 B2 * | 11/2007 | Sprenger et al. | ................. | 501/9 |
| 2003/0110931 A1 | 6/2003 | Aghajanian et al. | | |
| 2006/0166804 A1 | 7/2006 | Sprenger et al. | | |

FOREIGN PATENT DOCUMENTS

| | | |
|---|---|---|
| DE | 28 05 764 | 8/1978 |
| DE | 690 17 766 | 11/1995 |
| DE | 102 45 233 | 2/2004 |
| EP | 0 390 773 | 1/1994 |
| GB | 1 544 779 | 4/1979 |
| WO | 2004/031089 | 4/2004 |

\* cited by examiner

*Primary Examiner* — Karl E Group
(74) *Attorney, Agent, or Firm* — Ohlandt, Greeley, Ruggiero & Perle, LLP

(57) ABSTRACT

The invention relates to a glass ceramic armour material consisting (in % by weight in relation to oxide base) of 5-33 $SiO_2$, 20-50 $Al_2O_3$, 5-40 MgO, 0-15 $B_2O_3$, 0.1-30 $Y_2O_3$, $Ln_2O_3$, $As_2O_3$, $Nb_2O_3$ and/or $Sc_2O_3$ and 0-10 $P_2O_5$. The inventive armour material can also be reinforced with inorganic reinforcing fibres in a quantity of 5-65% by weight, preferably consisting of C, SiC, $Si_3N_4$, $Al_2O_3$, $ZrO_2$ or Sialon. Said armour material is characterised in that it exhibits a high elasticity modulus and is producible from green glass without to fear a premature crystallisation.

12 Claims, No Drawings

ARMOR MATERIAL MADE OF GLASS CERAMICS

The invention relates to an armor material for the protection of people or equipment against high-speed projectiles, fragments or the like. Such armor finds use in bullet-proof vests or automotive armoring in bullet-proof automobiles, helicopters, aircraft cabins etc.

Ceramic armor materials have been known for many years. They find use particularly in armor for which low weight is important, for example in bullet-proof vests and in armor for automobiles, aircraft and helicopters, and for the latter two especially in cockpits or seats and in functionally important parts. The first, and today still used, ceramic armor materials consisted of $Al_2O_3$, SiC, $B_4C$ or $TiB_2$. Such materials can currently be produced only by costly manufacturing processes, for example as described in US 2003/0110931 A1, by reactive infiltration of a porous carbon-containing boron carbide preform with molten silicon, and are therefore expensive.

For this reason it is has also been known for a long time to use glass-ceramics as armor material. For many years, glass-ceramics have been produced by devitrifying special glasses for this purpose. In the devitrification referred to as ceramization, part of the glass is converted by heat treatment into crystals lodged in a matrix consisting of the residual glass phase. The heat treatment is usually carried out in two steps. In a first step, the glass is heated for up to 24 hours to the nucleation temperature, namely to the temperature at which seed crystals are very readily formed in the glass. This nucleation temperature is just above the transition temperature of the glass, Tg. When a sufficient quantity of seed crystals have formed, the temperature is raised further until it is in the range in which crystals or crystallites (up to $10^{17}/cm^3$) are formed on the seed crystals.

The glass-ceramic armor material described in U.S. Pat. No. 4,473,653 has the composition (in wt. %) of 78.5-84.5; $SiO_2$; 9.5-15 $Li_2O$; 1-6 $Al_2O_3$ and 1.5-4 $K_2O$ with $TiO_2$, $ZrO_2$ or $SnO_2$ as nucleating agents.

EP 0 390 773 B1 and the equivalent U.S. Pat. No. 5,060,553 describe a composite armor material consisting, as seen in the direction of impact, of a front plate of glass-ceramic material to which is cemented a backing of fiber-reinforced plastic. According to claim 1, the composite armor material of this document is characterized by a heat treatment that corresponds to the afore-indicated common process for producing glass-ceramics. The glass-ceramics described in the Description contain mainly (in wt. %) 72 $SiO_2$, 10 $LiO_2$, 5 ZnO, 7 $Al_2O_3$, a second glass-ceramic material contains 71 $SiO_2$, 12 $Li_2O$, 13 $Al_2O_3$; a third glass-ceramic material contains 36.5 $SiO_2$, 33.2 $Al_2O_3$, 17 $ZrO_2$ and 13.1 Mg), and a fourth glass-ceramic material contains 48.8 $SiO_2$, 26.5 $Al_2O_3$, 11.0 $TiO_2$, 8.4 MgO, 5.0 CaO and 0.3 $Cr_2O_3$. The glass-ceramics of the $SiO_2$—$Al_2O_3$—MgO system commonly used until now usually contain as the main crystal phase enstatite, forsterite and cordierite. Spinel and sapphirine phases, too, have been described as secondary phases. In these cases, the lower limits of the $SiO_2$ content are commonly between 40 or 42-44 wt. %. Until now it has been assumed that below this concentration no glasses processable on an industrial scale can be produced.

The drawback of the glass-ceramics until now used for armoring is that, on the average, they have an E-modulus [modulus of elasticity] of about 130 GPa and a lower specific E-modulus (E-modulus/density).

Hence, the objective of the present invention is to find glass-ceramics suitable for armor that have a high E-modulus, a high fracture toughness and high breaking strength and the glass starting materials for which are resistant to devitrification and crystallization during the cooling carried out to achieve annealing, namely they are in the glass phase until the intended nucleation/crystallization is attained.

This objective is reached by use of a glass-ceramic armor material containing (in wt. %, oxide basis):

| | |
|---|---|
| 5-33 | of $SiO_2$ |
| 20-50 | of $Al_2O_3$ |
| 5-40 | of MgO |
| 0-15 | of $B_2O_3$ |
| 0.1-30 | of $Y_2O_3$, $Ln_2O_3$, $As_2O_3$, $Nb_2O_5$ and/or $Sc_2O_3$ |
| 0-10 | of $P_2O_5$ |

Within this composition range, two composition ranges are particularly preferred:

Composition range A:

| | |
|---|---|
| 5-33 | of $SiO_2$ |
| 25-40 | of $Al_2O_3$ |
| 5-25 | of MgO |
| 0.1-30 | of $Y_2O_3$, $Ln_2O_3$, $As_2O_3$ and/or $Nb_2O_5$ |
| 0-15 | of $B_2O_3$ |
| 0-10 | of $P_2O_5$ | and Composition range B:

| | |
|---|---|
| 17-33 | of $SiO_2$ |
| 20-50 | of $Al_2O_3$ |
| 8-40 | of MgO |
| 0.1-30 | of $Y_2O_3$, $Sc_2O_3$ and/or $Nb_2O_5$ |
| 1-15 | of $B_2O_3$ |

For composition A, the smallest amount of $SiO_2$ is 5wt. %, particularly 10 wt. % and preferably 15 wt. % and for composition B it is preferably 18 wt. % and particularly 19 wt. %. The upper limit is usually 33 wt. % with 28 wt. % and particularly 25 wt. % being preferred.

The smallest amount of MgO is 5 wt. % and for composition A preferably 8 wt. % and most preferably 10 wt. % whereas for composition B at least 10 wt. % and particularly 15 wt. % is used. For composition A, the upper limit of the MgO content is 25 wt. % and preferably 20 wt. %, the upper limit usually being 40 wt. %, with 30 or 25 wt. % and especially 20 wt. % being preferred.

For composition A, the maximum amount of $Al_2O_3$ is 50 wt. %, particularly 40 wt. % and preferably 38 wt. % and for composition B it is most preferably 30 wt. %. The smallest amount of $Al_2O_3$ is 25 wt. %.

Boron oxide must not necessarily be present but the amount of $B_2O_3$ is, in particular, 1 wt. %, preferably 2 wt. % and most preferably 3 wt. %. Its upper limit in the composition of the invention is at the most 15 wt. %, usually at the most 12 wt. % and preferably at the most 10 wt. % or at the most 9 wt. %.

The addition of one or more of the oxides $Y_2O_3$, $Ln_2O_3$, $As_2O_3$, $Sc_2O_3$ and $Nb_2O_5$ improves the industrial processability of the glasses before ceramization and renders the glass-ceramics prepared therefrom particularly rigid and break-resistant. Moreover, it ensures that the glasses during the cooling for annealing purposes, namely prior to the desired nucleation, are resistant to the formation of the crystalline phases and thus can be cooled to achieve annealing. In this manner, constant ratios exist before the nucleation phase so that the formation of a product with constant, reproducible properties is markedly simplified. The oxides of this group are used in the glass-ceramics in an amount of at least 0.1 wt. %, usually at least 3 wt. %, preferably at least 10 wt. % and most preferably 12 wt. %. The upper limit of these oxides is 30 wt. % and preferably 28 wt. %, an upper limit of 25 wt. % being especially preferred. The amounts of the individual oxides are usually 1 to 30 wt. % and preferably 10-30 wt. % of $Y_2O_3$ and preferably 0-20 wt. % of each of $Ln_2O_3$, $Nb_2O_5$ and $Sc_2O_3$. Composition A preferably contains no $Sc_2O_3$ and composition B preferably contains no $Ln_2O_3$.

Ln comprises the group of lanthanoids and particularly La, Ce, Pr, Nd, Eu, Yb, Ho and Er.

The composition of the invention can contain as additional components common refining agents and fluxes such as $Sb_2O_3$, $As_2O_3$ or $SnO_2$, in amounts normally used for these purposes. The upper limit for $Sb_2O_3$ or $As_2O_3$ is usually at the most 5% and preferably at the most 2%.

In a preferred embodiment, the glass-ceramic contains 0-12 wt. % and particularly 0-10 wt. % of $TiO_2$, 0-10 wt. % of $ZrO_2$, 0-10 wt. % and particularly 0-5 wt. % of CaO, 0-10 wt. % and particularly 0-5 wt. % of SrO, 0-10 wt. % and particularly 0-5 wt. % of BaO and 0-20 wt. % and particularly 0-10 wt. % of ZnO In a further preferred embodiment of the invention, the composition contains at least 2 wt. % and preferably at least 4 wt. % of $TiO_2$ and a maximum amount of preferably 12 wt. % and particularly at the most 10 wt. %. If at all present, each of the other said oxides $ZrO_2$ and ZnO is present in a minimum amount of 1 or 2 wt. % and a maximum amount of 5 or 8 wt. %.

The glass-ceramic is preferably essentially free of alkali metal oxides such as $Li_2O$, $Na_2O$ and $K_2O$ and contains these only as impurities entrained with the other components of the mixture. Here, "essentially free of alkali metal oxides" means an amount of at the most 2 wt. %, an amount of at the most 0.5 wt. % being common. Preferred glass-ceramic products have an alkali metal content of less than 0.5 wt. %.

We have found that the glass-ceramic can contain up to 10 wt. % and usually less that 5 wt. % of transition metal oxides without a significant change in properties such as rigidity, breaking strength and crystallization behavior. Transition metal oxides that can be contained in the glass or glass-ceramic of the invention comprise the oxides of the elements Fe, Co, Ni, Cr, Mn, Mo, V, Pt, Pd, Rh, Ru, and W and particularly the oxides $MnO_2$, $Fe_2O_3$, NiO, CoO, $Cr_2O_3$, $V_2O_5$, $MoO_3$ and/or $WO_3$.

Furthermore, the glass-ceramic can contain as stabilizing components (besides MgO) the alkaline earth metal oxides CaO, SrO and BaO. The total amount of these three components can be up to 20 wt. % and particularly up to 15 wt. %. In a preferred embodiment the total amount of these three alkaline earth metal oxides is at least 1 wt. %, preferably at least 2 wt. %, most preferably up to 4 wt. % and especially up to 5 wt. %.

If present, the amount of the oxides $TiO_2$ and $ZrO_2$ in an embodiment preferred according to the invention is at least 1 wt. % and preferably at least 2 wt. % and at the most preferably 13 wt. % and particularly at the most 10 wt. %. The glass-ceramic can contain a nucleating agent besides $TiO_2$ and $ZrO_2$ also $P_2O_5$ in an amount of up to 10 wt. %. When the amount of $P_2O_5$ added is in the upper part of this range, then this compound is incorporated also into the crystals being formed. A preferred $P_2O_5$ content is less than 10 wt. % and preferably less than 5 wt. %. Advantageous is a minimum $P_2O_5$ content of 2 wt. % provided this compound is at all added.

In the armor material of the invention, the crystallites are embedded in a glassy matrix and their size ranges from about 20 nm to 3 μm. Preferred are crystallite sizes of 50 to 500 nm. The amount of crystal phase in the armor material is from 30 to 80 vol. %, the main crystal phases being spinel ($MgO \cdot Al_2O_3$), sapphirine (5 $MgO \cdot 7 Al_2O_3 \cdot 9 SiO_2$) and possibly Y silicates (for example $Y_2Si_2O_7$ or $Y_2SiO_5$). By main crystal phases is meant that the main phases amount to at least about 50% of the total crystal phases.

The good bullet penetration-inhibiting properties of these glass-ceramics are further improved by fiber reinforcement, so that the relatively simple way of producing the new armor provides additional advantageous savings.

The reinforcing fibers should be present in the armor material in an amount from 5 to 65 vol. %. A reinforcement of the glass-ceramic products takes place even when the amount of added fibers is below the indicated lower limit, but their effect is then generally too low for an appreciable improvement of the use properties of the armor. Preferred reinforcing fiber contents range from 15 to 45 vol. %. An amount of 65 vol. % should not be exceeded, because homogeneous mixing of the fibers with the glass (glass-ceramic) matrix would then no longer be ensured. Moreover, the residual glass (glass-ceramic) matrix phase would be too small and no longer capable of reliably carrying out its bonding function, namely to hold the composite together.

Suitable as reinforcing fibers are all inorganic fibers with a high tensile strength and which can be well anchored in the glass-ceramic matrix. For the sintering process, the fibers must be heat-resistant to at least about 1000° C. and must not react with the base glass and the glass-ceramic material thus weakening their strength properties.

Suitable reinforcing fibers are fibers consisting of carbon, SiC, $Si_3N_4$, $Al_2O_3$, $ZrO_2$ and/or fibers of the SiAlON type (Si, Al, O, N), furthermore fibers of BN or TiC, of other non-oxide ceramics as well as of coated fibers of oxide ceramics or metals. Fibers of carbon and silicon carbide are particularly preferred.

The fibers used are short fibers, long fibers and/or continuous fibers. Short fibers have a length of about 50 μm to 5 cm and preferably about 10 to 30 mm, by long fibers are meant fibers of up to 20 cm in length and continuous fibers have a length of >20 cm. Suitable are, for example, carbon fibers or ceramic fibers, for example SiC fibers. In this case, the diameter of the fibers is 4-10 μm for carbon fibers and 8-15 μm for SiC fibers.

Long and/or infinite fibers bring about an unusually pronounced increase in fracture toughness and strength. Short fibers are easier to handle on an industrial scale, they improve the economics of the manufacturing process and are adequate when a maximum increase in fracture toughness and strength is not required.

Whiskers can also be used as reinforcing fibers, for example whiskers of all materials indicated hereinabove under fibers, whiskers of WC and whiskers of metals. In general, whiskers are 5 μm to 500 μm long and have a diameter of 1 μm to 10 μm. During the production of the armor materials, they can be distributed in the glass-ceramic matrix in a very simple manner and in unusually high amounts by volume, but the strength that can be attained with them is not as high as when the armor materials are reinforced with the short, long and continuous fibers.

It can be advantageous to provide the fibers with an inorganic lubricant. The use of such coated fibers provides an industrial material having unusually high fracture toughness. In carbon-containing non-oxide fibers this is due to the fact that an extremely thin gliding layer with a graphite structure is formed on the surface of the fibers which under high mechanical stress causes part of the energy to be converted for the pulling out, stretching and tearing (known as pull-out effect). This leads to a markedly higher rupture work, fracturing toughness and strength. The same can logically also be said for oxide fibers the surface of which has previously been conditioned with an appropriate high-temperature lubricant such as, for example, mica or some other layer silicate.

The fibers can be arranged in the armor material in any desired manner. Whiskers and short fibers of up to about a 30-mm length are generally arranged in a tangled manner, meaning that they are not aligned in the material.

The composite of glass-ceramic and fibers will be stronger, however, if the fibers are aligned in the composite. For example, the fibers can have a layered structure in which the fibers in each layer, referred to as tape, are parallel to each other, but adjacent layers have fiber axes that are displaced by 90° or 45°. Layered structures of this kind are known from the production of fiber-reinforced plastic articles.

The reinforcing fibers can also be present in the armor material, for example, in the form of a fabric. Preferred is a textile fabric in the form of a laying, knitted fabric or felt. Particularly preferred is a knitted fabric. Because of its mesh structure, such a fabric also makes it possible to produce complex, shaped geometries which can be advantageous, for example, in motor vehicle armoring.

It can also be advantageous not to distribute the textile fabric reinforcement uniformly in the armor material but to provide such distribution only on the front or back side of the material, namely quasi asymmetrically. When the glass-ceramic is reinforced on both sides with a textile fabric or with tapes, the unreinforced glass-ceramic layer present between the layers of reinforcing fibers is then, so to speak, covered. In one-sided reinforcement, the armor material resembles the formerly used composites made of a ceramic plate strengthened on the back side with a cemented-on metal plate. In the event that the fiber reinforcement is present as a layer on an otherwise not reinforced glass-ceramic material, the layer thickness should preferably be at least 10% of the layer thickness of the armor material, but in any case at least 1 mm, and preferably more than 2 mm. Preferably, the layer thickness should not exceed 5 mm, because otherwise the overall composite would then be too heavy for light-weight armor.

As a rule, a fiber-reinforced ceramic armor material is produced by use of sintering technology whereby a mixture of reinforcing fibers and powdered matrix material is sintered together by the action of heat and optionally pressure. As the ground, powdered glass-ceramics is difficult to sinter or can be sintered only with unsatisfactory results, it is preferred to use as starting material the readily sintered, non-ceramized glass powder and then ceramize the resulting sintered body during or after the sintering.

Hence, at first a powder is produced from the glass that has the same composition as the glass-ceramic later made from it. In addition to the previously mentioned advantages of better sintering properties, this method also has the advantage that glass can be ground to a powder more readily than a glass-ceramic material.

This glass powder is then either mixed with the reinforcing fibers, which is done primarily when whiskers and short fibers are used, or the pores of a textile fabric made of reinforcing fibers are filled with the glass powder.

The mixing of glass powder and reinforcing fibers can be done in the dry state, but it is preferred to use the glass powder in the form of a suspension in water preferably containing a certain amount of a binder. In this case, the glass powder has an average particle density $d_{50}$ [sic] from 5 μm to 60 μm and preferably from 8 μm to 35 μm. With a particle size below 5 μm, the cost of producing the glass powder increases markedly and its handling is difficult without any additional advantages being achieved by use of such a powder. With particle sizes above 60 μm it is difficult to obtain homogeneous mixtures and, in the subsequent processing steps, pore-free composites.

To prepare a suspension, it is possible to use deflocculants which are known to be used in the ceramic industry to stabilize the slip, for example low-molecular-weight anionic polymers, particularly sodium polyacrylates.

The suspensions can also contain binders to confer to the crude formation obtained by drying (prepreg) sufficient rigidity to enable it to be handled. Such binders are also known. If the deflocculant itself does not also carry out a binding function, a latex binder, for example dextrin or the like, can be added.

The suspension should have as high a solids (glass powder) content as possible and at the same time a low viscosity so as to be able to fill the pores of the textile structure of the reinforcing fibers as completely as possible or to provide during the mixing with short fibers and/or whiskers a high content of fibers (whisker content) without exposing the fibers to excessive mechanical stress.

The armor material serves to produce armor. To this end, it is usually processed with other materials to form an armor. For example, the armor material in the form of tiles, small plates or spheres is fastened on or in a fabric of high-strength fibers such as aramide fibers or the like. The armor material can also be bonded on its back side to metal plates of aluminum, steel or titanium or be cemented to composite materials such as fiber-reinforced plastics. The possibilities of combination with other materials are already known from the use of known ceramic materials and are part of the experience and knowledge of an average specialist in this field.

The afore-said textile fabrics are produced by use of conventional processes employed in the textile or paper industry. They are known as such and are not an object of the pre-sent invention. For this reason, they will not be described in detail.

After appropriate sizing, a prepreg having the indicated fiber architecture is prepared. By prepreg is meant an uncompressed arrangement of a multitude of deposited fibers provided with matrix material and being in partial mutual contact. Several textile fabrics can also be disposed on top of each other. The prepreg still has a high pore content and has from 10% to 80% of the density of the end product.

In the production of prepregs with a glass powder suspension, it is preferred that the textile fabric in its porous form be impregnated with the suspension. The water is removed from the suspension though the walls of the porous mold, and the wet prepreg is removed from the mold and dried.

After drying, the prepreg is compressed by the action of pressure and heat. This can be achieved using hot presses where the pressure and temperature are adapted to the melting temperature of the matrix involved. Typically, the selected temperature is >1000° C. and the pressure >5 MPa. Under these processing conditions, the entire glass is melted, or a sintering process is used so that the latter case can be referred to as a pressure sintering process.

The crude, mostly pore-free body consisting of reinforcing fibers and glass matrix and produced in this manner is then ceramized, namely the glass matrix is converted into a glass-ceramic matrix.

The conversion of the glass phase into a glass-ceramic material is performed by the common process which has been known for decades. When oxidation-sensitive reinforcing fibers or sintering is used, however, the presence of oxygen must be excluded.

The glass phase is converted into the corresponding glass-ceramic by heat treatment at a temperature above the Tg. The conversion temperature and the formation of crystal phases are determined in the known manner, for example by means of a holding curve obtained by differential thermal analysis (DTA).

First, the crude body is heated to the nucleation temperature at which crystallization nuclei are formed in the glass. To this end, the glass is usually heated to a temperature of about 5-50° C. above the $T_g$ and preferably 10-30° C. above the $T_g$ until a sufficient number of primary crystals have been formed. The usual glass transition temperature of these glasses is 700-850° C.

The holding temperature for the formation of the primary crystals or crystal nuclei depends on the properties desired and usually is maintained for at least 0.5 hour, preferably at least 1 hour and most preferably at least 1.5 hours. The maximum duration is usually 3 days, with 2 days, and particularly 1 day, being preferred as the maximum duration for the formation of primary crystals. In most cases, a duration of 2-12 hours is sufficient.

After the desired number of crystal nuclei has formed, the mixture is heated to a higher temperature at which the main crystal phases separate. This temperature is usually at least 20° C. and preferably at least 50° C. above the temperature of formation of the primary crystallites. In special cases, it has been found advantageous, after the separation of the main crystal phases (secondary crystals), particularly of spinel and sapphirine, to reheat the mixture to a higher temperature to separate other crystal phases, for example pyrochlores, pyrosilicates, xenotimes and/or rutile as well as mixtures thereof, from the residual glass phase left between the primary and/or secondary crystals.

Because the compression of the base body is done by hot-pressing, however, the required nucleation and/or crystallization processes can occur at the same time as the compression during hot-pressing. By appropriate conduction of the heating process, the ceramization occurs in situ, that is to say in an unusually fast and economic manner.

Another advantageous production process that does not start with glass powder consists of thermally softening a glass plate made of crude glass and then working a textile fabric of reinforcing fibers into the glass surface under pressure, for example by rolling. This method is extraordinarily economical and is promoted especially by the fact that the starting glass for the described glass-ceramic does not tend to undergo undesirable nucleation and crystallization as do the starting glasses with a different composition.

The armor material is intended for armor production. To this end, this material is usually processed with other materials affording an armor. For example, the armor material in the form of tiles, small plates or spheres is fastened on or in a fabric of high-strength fibers such as aramide fibers or the like. It is also possible to bond to the back side of the armor material metal plates such as aluminum, steel or titanium plates or cement to it composite materials such as fiber-reinforced plastics. The possibility of combinations with other materials is already known from the use of known ceramic materials and forms part of the experience and knowledge of an average specialist in this field.

Note that a particular advantage of the armor material of the invention is that the crude glass underlying the glass-ceramic is, as already stated, insensitive to spontaneous undesirable nucleation. This property makes it possible to anneal the green glass thermally prior to ceramization in a very simple manner and to bring it to its softening temperature and then to shape it into a desired final shape. This final shape is then ceramized. In this manner, it is possible to produce armor materials that are particularly well adapted to the planned application, for example to body rounding, motor vehicle walls and the like.

EXAMPLES 1 TO 4

Various glasses were melted and converted into glass-ceramic material in a manner known as such. The composition (in wt. %, oxide basis), temperature and duration of nucleation, temperature(s) and duration of crystallization as well as the E-modulus, density, specific E-modulus (E-modulus/density) and for Example 1 also the K1c value (breaking strength) are shown in the following Table 1.

EXAMPLES 5-7

Various fiber-reinforced composites were prepared. Their composition and physical data are shown in Table 2.

TABLE 1

| Example | 1 | 2 | 3 | 4 |
|---|---|---|---|---|
| $SiO_2$ | 19.43 | 32.72 | 21.26 | 22.70 |
| $B_2O_3$ | 3.75 | 3.79 | 0.00 | 1.77 |
| $P_2O_5$ | 0.00 | 0.00 | 10.00 | 7.20 |
| $Al_2O_3$ | 32.97 | 37.02 | 26.41 | 31.70 |
| $TiO_2$ | 4.31 | 2.90 | 9.41 | 8.11 |
| $Y_2O_3$ | 24.34 | 8.20 | 18.81 | 14.00 |
| MgO | 15.20 | 15.37 | 9.97 | 13.10 |
| CaO | 0.00 | 0.00 | 1.32 | 1.42 |
| SrO | 0.00 | 0.00 | 1.22 | 0.00 |
| BaO | 0.00 | 0.00 | 1.81 | 0.00 |
| Nucleation | 850° C. 1/h | 850° C./1 h | 750° C./2 h | 800° C./2 h |
| Crystallization | 950° C./2 h + 1050° C./2 h | 950° C./1 h | 780° C./1 h + 800° C./60 h | 1050° C./3 h |
| E-Modulus [GPa] | 190 | 145 | 140 | 180 |
| K1c [MPa × $m^{-1/2}$] | 1.79 | | | |
| Density [g/$cm^3$] | 3.58 | 3.10 | 3.05 | 3.25 |
| Spec. E-modulus [MJ × $kg^{-1/2}$] | 53.1 | 46.8 | 45.9 | 55.4 |

TABLE 2

| Example | 5 | 6 | 7 |
|---|---|---|---|
| Matrix composition as in example | 1 | 2 | 4 |
| Wt. % of matrix | 55 | 60 | 45 |
| Wt. % of C fiber (length 30 mm, diameter 8 μm) | | 40 | 30 |
| Wt. % of SiC fiber (length 30 mm, diameter 15 μm) | 45 | | 25 |
| Density (g × cm$^{-3}$) | 3 | 2.7 | 2.75 |
| E-modulus [GPa] | 280 | 275 | 340 |
| Specific E-modulus [GPa × cm$^3$ × g$^{-1}$] | 99.3 | 102 | 124 |

The invention claimed is:

1. Armor material made of a glass-ceramic, containing (in wt. %, oxide basis):

| | |
|---|---|
| 5-33 | of SiO$_2$ |
| 20-50 | of Al$_2$O$_3$ |
| 5-40 | of MgO |
| 0-15 | of B$_2$O$_3$ |
| 0.1-30 | of Y$_2$O$_3$, Ln$_2$O$_3$, As$_2$O$_3$, Nb$_2$O$_5$ and/or Sc$_2$O$_3$ |
| 0-10 | of P$_2$O$_5$ |
| 0-12 | of TiO$_2$, | wherein Ln is a lanthanoid element, and
wherein the armor material is reinforced with fibers comprising a material selected from the group consisting of carbon, silicon carbide, Si$_3$N$_4$, Al$_2$O$_3$, ZrO$_2$, sialon, and any combinations thereof.

2. Armor material according to claim 1, containing (in wt. %, oxide basis):

| | |
|---|---|
| 5-33 | of SiO$_2$ |
| 20-40 | of Al$_2$O$_3$ |
| 5-25 | of MgO |
| 0.1-30 | of Y$_2$O$_3$, Ln$_2$O$_3$, As$_2$O$_3$, and/or Nb$_2$O$_5$ |
| 0-15 | of B$_2$O$_3$ |
| 0.1-10 | of P$_2$O$_5$. |

3. Armor material according to claim 1, containing (in wt. %, oxide basis):

| | |
|---|---|
| 17-33 | of SiO$_2$ |
| 20-50 | of Al$_2$O$_3$ |
| 8-40 | of MgO |
| 0.1-30 | of Y$_2$O$_3$, Sc$_2$O$_3$ and/or Nb$_2$O$_5$ |
| 0-15 | of B$_2$O$_3$. |

4. Armor material according to claim 1, further comprising an amount of alkali metal oxide of less than 2 wt. %.

5. Armor material according to claim 1, further comprising transition metal oxides in an amount of up to 10 wt. %.

6. Armor material according to claim 5, wherein said transition metal oxides are selected from the group consisting of MnO$_2$, Fe$_2$O$_3$, NiO, CoO, Cr$_2$O$_3$, V$_2$O$_5$, MoO$_3$ or WO$_3$ and any combinations thereof.

7. Armor material according to claim 1, further comprising at least one of IrO$_2$ in an amount of up to 10 wt. %, and ZnO in an amount of up to 10 wt. %.

8. Armor material according to claim 1, further comprising up to 5 wt. % of a compound selected from the group consisting of CaO, SrO, BaO, and any combinations thereof.

9. Armor material according to claim 1, further comprising up to 10 wt. % of a compound selected from the group of CaO, SrO, BaO, and any combinations thereof.

10. Armor material according to claim 1, wherein the armor material has a crystal phase content from 30 to 80 vol. %.

11. Armor material according to claim 1, wherein said fibers in the armor material are present in an amount of 5 to 65 vol. %.

12. Armor material according to claim 7, wherein said TiO$_2$ is present in an amount of 2 to 10 wt %, said ZrO$_2$, if present, is present in an amount of 1 to 8 wt %, and said ZnO, if present, is present in an amount of 1 to 8 wt %.

* * * * *